United States Patent
Amaya et al.

(10) Patent No.: US 11,955,858 B2
(45) Date of Patent: Apr. 9, 2024

(54) ROTARY MACHINE AND INSULATOR

(71) Applicant: TOP CO., LTD., Fukui (JP)

(72) Inventors: Yuji Amaya, Fukui (JP); Norihito Shimode, Fukui (JP); Yuga Hashizume, Fukui (JP); Takao Sakai, Fukui (JP); Kenji Sasaki, Fukui (JP)

(73) Assignee: TOP CO., LTD. (JP)

( * ) Notice: Subject to any disclaimer, the term of this patent is extended or adjusted under 35 U.S.C. 154(b) by 585 days.

(21) Appl. No.: 17/256,722

(22) PCT Filed: Nov. 21, 2019

(86) PCT No.: PCT/JP2019/045539
§ 371 (c)(1),
(2) Date: Dec. 29, 2020

(87) PCT Pub. No.: WO2020/183801
PCT Pub. Date: Sep. 17, 2020

(65) Prior Publication Data
US 2021/0257873 A1    Aug. 19, 2021

(30) Foreign Application Priority Data

Mar. 13, 2019 (JP) ................................. 2019-046566

(51) Int. Cl.
*H02K 3/34* (2006.01)
*H02K 1/14* (2006.01)
*H02K 5/08* (2006.01)

(52) U.S. Cl.
CPC ............. *H02K 3/345* (2013.01); *H02K 1/148* (2013.01); *H02K 5/08* (2013.01)

(58) Field of Classification Search
CPC ........... H02K 3/345; H02K 1/148; H02K 5/08
See application file for complete search history.

(56) References Cited

U.S. PATENT DOCUMENTS

2011/0084562 A1    4/2011   Shinohara
2014/0319937 A1   10/2014   Shirai et al.
(Continued)

FOREIGN PATENT DOCUMENTS

JP    2000008538 A    1/2000
JP    2000038000 A    2/2000
(Continued)

OTHER PUBLICATIONS

International Search Report for Application No. PCT/JP2019/045539 dated Feb. 4, 2020, 2 pages.
(Continued)

*Primary Examiner* — Tulsidas C Patel
*Assistant Examiner* — Mohammed Ahmed Qureshi
(74) *Attorney, Agent, or Firm* — Lerner David LLP

(57) ABSTRACT

A first portion of an insulator is provided on a first region of an end surface of a tooth. A second portion of the insulator is provided on a second region of the end surface of the tooth so as to be separated from the first portion in a circumferential direction. A third portion of the insulator is connected to fourth side ends of the first portion and the second portion in a radial direction. A coil includes a crossing portion in a coil end. A stator includes an insert body in a housing space. The insert is made of a material having a higher thermal conductivity than a material forming the insulator.

5 Claims, 7 Drawing Sheets

(56) References Cited

U.S. PATENT DOCUMENTS

2015/0008769 A1* 1/2015 Uchitani ................. H02K 3/30
310/43
2017/0005538 A1 1/2017 Lee

FOREIGN PATENT DOCUMENTS

| JP | 2009106113 A | 5/2009 |
|---|---|---|
| JP | 2011254689 A | 12/2011 |
| JP | 2015035879 A | 2/2015 |
| WO | 2013140564 A1 | 9/2013 |
| WO | 2014115775 A1 | 7/2014 |

OTHER PUBLICATIONS

Communication pursuant to Article 94(3) EPC for Application No. 19918916.8 dated Sep. 21, 23. 7 pgs.

* cited by examiner

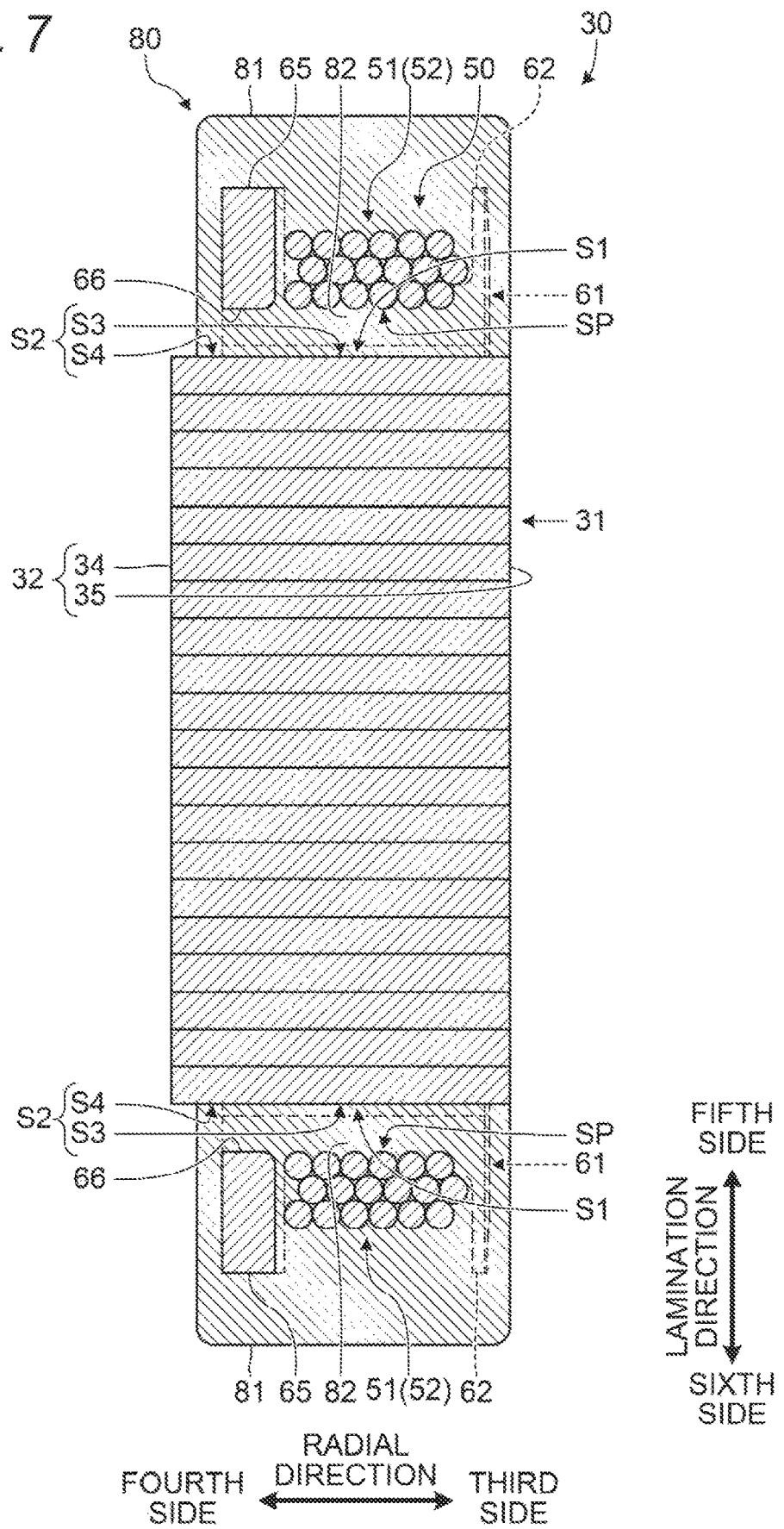

ROTARY MACHINE AND INSULATOR

CROSS-REFERENCE TO RELATED APPLICATIONS

This application is a national phase entry under 35 U.S.C. § 371 of International Application No. PCT/JP2019/045539 filed Nov. 21, 2019, which claims priority from Japanese Patent Application No. 2019-046566 filed in the Japanese Patent Office on Mar. 13, 2019, the entire contents of which are hereby incorporated by reference herein.

TECHNICAL FIELD

The present invention relates to a rotary machine such as a motor and a generator, and an insulator for a stator of the rotary machine.

BACKGROUND ART

Technology related to rotary machines has been proposed. For example, Patent Document 1 discloses a coil holding member of an electrical device. The holding member is mounted inside a coil. The integrated coil and holding member are mounted on a tooth. The holding member has a base plate and a cylindrical portion. The base plate is located at a base of the tooth. The cylindrical portion surrounds the circumference of the tooth. The cylindrical portion is connected to the edge of an opening of the base plate. The cylindrical portion has a substantially quadrangular cross-sectional shape. The cylindrical portion has four side surfaces which respectively correspond to four side surfaces of the tooth. The transverse side surface of the cylindrical portion is located inside a coil end when the holding member is mounted to the coil. The cylindrical portion functions as an insulating member between the coil and the tooth. A locking piece and a holding rib are provided on the outside of the transverse side surface of the cylindrical portion. The locking piece extends from the base plate in the direction of the tip of the tooth along the axis direction of the tooth, at a distance from the transverse side surface of the cylindrical portion. A locking claw is provided at the tip of the locking piece. The locking claw engages with the coil. The holding ribs are provided on the transverse side surface of the cylindrical portion, and are provided on both sides of the locking piece so as to extend in the tooth axis direction. At the holding rib, the end surface abuts to the inner circumference of the coil. As a result, the position of the coil in the transverse direction of the tooth is determined. After mounting the coil to a stator core, the coil end of the coil is insert molded with a filler. The filler goes to the bottom side of the locking piece and pushes the locking piece upwards or supports the locking piece.

CITATION LIST

Patent Literature

Patent Document 1: JPA No. 2015-35879

SUMMARY OF INVENTION

Problems to be Solved by the Invention

In a stator of a rotary machine, a coil generates heat when electric current flows through the coil. Accordingly, a temperature of the coil rises. When the temperature of the coil rises, an electric resistance value of the coil rises. The coil is provided with an insulating coating. When the temperature of the coil rises, it may be necessary to take measures against deterioration of the insulating coating. Therefore, the inventor considered a structure of the rotary machine which is capable of suppressing the temperature rise of the coil when the rotary machine is driven.

An object of the present invention is to provide a rotary machine capable of suppressing a temperature rise of a coil with a stator, and an insulator for the stator of the rotary machine.

Solutions to Problems

One aspect of the present invention is a rotary machine including: a rotor, and a stator wherein the stator including: a stator core formed by laminating steel plates and includes a yoke and a tooth which protrudes from the yoke towards a side of the rotor; an insulator which is provided to the stator core, and a coil which is provided to the tooth via the insulator, wherein the insulator including: a first portion which is provided on a first region on a first side in a circumferential direction about a rotation axis of the rotor of an end surface of the tooth in a lamination direction in which the steel plates are laminated; a second portion which is provided on a second region on a second side in the circumferential direction of the end surface of the tooth, and which is separated from the first portion in the circumferential direction, and a third portion provided on a fourth side opposite to a third side, the third side is a side which is closer to the rotor in a radial direction about the rotation axis of the rotor than the first portion and the second portion, the third portion is connected to a fourth side end of the first portion in the radial direction and is connected to a fourth side end of the second portion in the radial direction, wherein the coil includes, in a coil end of the coil, a crossing portion which crosses between the first portion and the second portion in the circumferential direction, wherein the stator further includes an insert body provided in a contact state with a third region and the crossing portion, the third region which is between the first region and the second region in the circumferential direction of the end surface of the tooth, the insert body is provided in a housing space which is surrounded by the crossing portion, the first portion, and the second portion on the third region, wherein the insert body is made of a material having a higher thermal conductivity than a material forming the insulator.

According to this rotary machine, heat generated by the coil can be released to the stator core via the insert body.

The third portion may include an opening which penetrates the third portion in the radial direction, and which leads to the housing space. According to this configuration, the insert body can be provided in the housing space from the fourth side in the radial direction via the opening.

The stator may be provided with a molded body made of resin which covers the coil end, and wherein the molded body may include the insert body. According to this configuration, a part of the molded body can be used as an insert body.

Another aspect of the present invention is an insulator which is provided to a stator core of a stator of a rotary machine, the insulator including: a first portion which is provided on a first region on a first side in a circumferential direction about an rotation axis of a rotor of the rotary machine of an end surface of a tooth of the stator core in a lamination direction in which steel plates which forms the stator core are laminated; a second portion which is provided on a second region on a second side in the circumferential direction of the end surface of the tooth, and which is separated from the first portion in the circumferential direction, and a third portion provided on a fourth side opposite to a third side, the third side is a side which is closer to the rotor in a radial direction about the rotation axis of the rotor than the first portion and the second portion, the third portion is connected to a fourth side end of the first portion in the radial direction and is connected to a fourth side end of the second portion in the radial direction.

According to this insulator, the above-mentioned housing space can be formed.

Accordingly, the above-mentioned rotary machine can be realized.

Advantageous Effects of the Invention

According to the present invention, a rotary machine capable of suppressing a temperature rise of a coil with a stator, and an insulator for the stator of the rotary machine can be obtained.

BRIEF DESCRIPTION OF DRAWINGS

FIG. 7 is a cross-sectional view taken along line B—B shown in FIG. 1.

DESCRIPTION OF EMBODIMENTS

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. The present invention may include other configurations.

<Motor 10>

A motor 10 as a rotary machine will be described with reference to FIGS. 1 to 7. The motor 10 is installed in various products. For example, the motor 10 is used as a drive source for rotating a fan of an air conditioner. The motor 10 is used as a drive source for a compressor. The motor 10 is used as a drive source for an electric vehicle. Examples of electric vehicles include electric automobiles, electric bicycles, electric wheelchairs, electric carts and electric catering vehicles. The electric automobiles include hybrid vehicles. The motor 10 includes a rotor 20 and a stator 30 (see FIGS. 1 and 2). In the embodiment, the motor 10 is an inner rotary type brushless motor.

Figure 1:
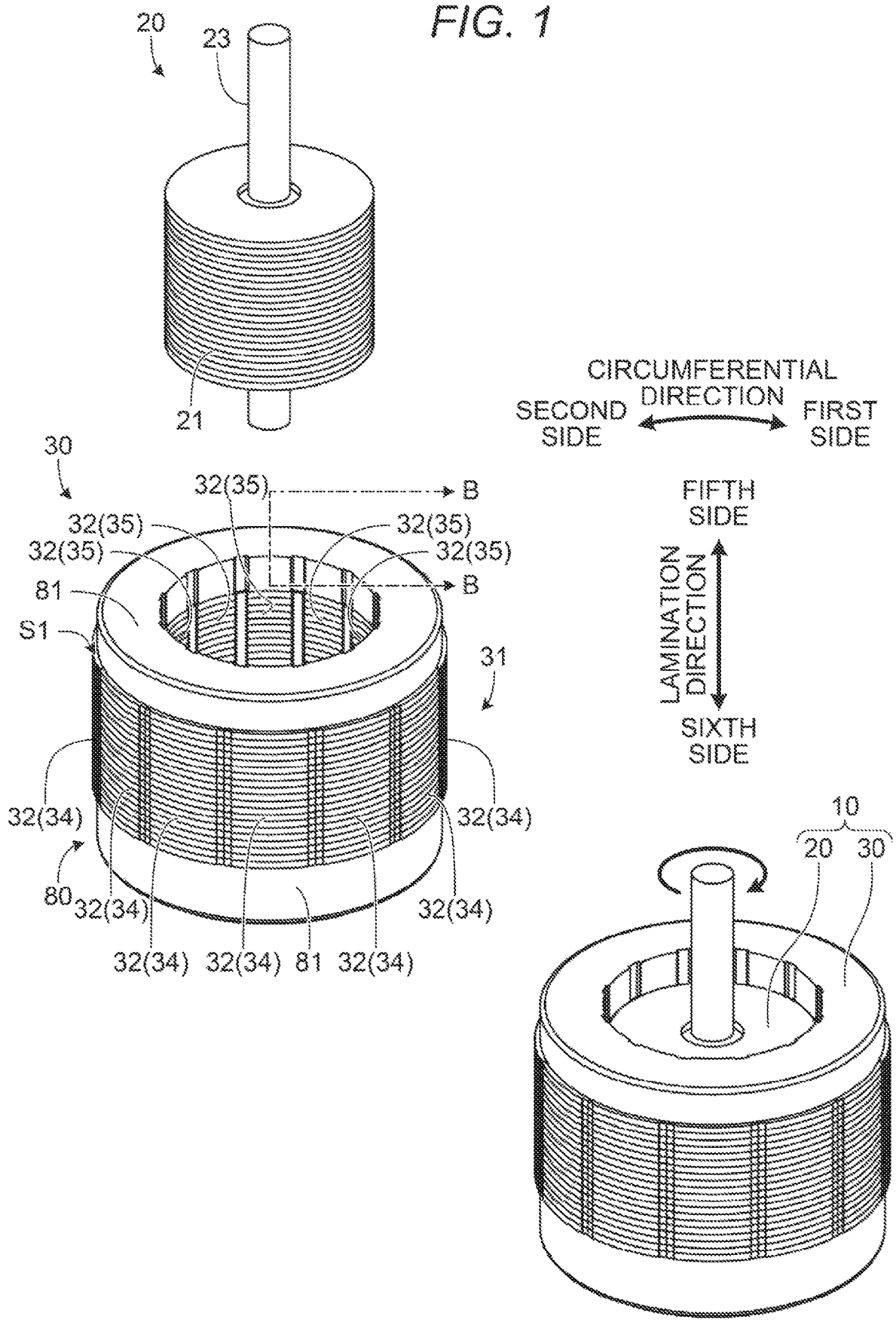
FIG. 1 is a perspective view which shows examples of schematic structures of a motor as a rotary machine, a rotor and a stator. The upper row shows the rotor. The middle row shows the stator. The lower row shows the motor.
Figure 2:
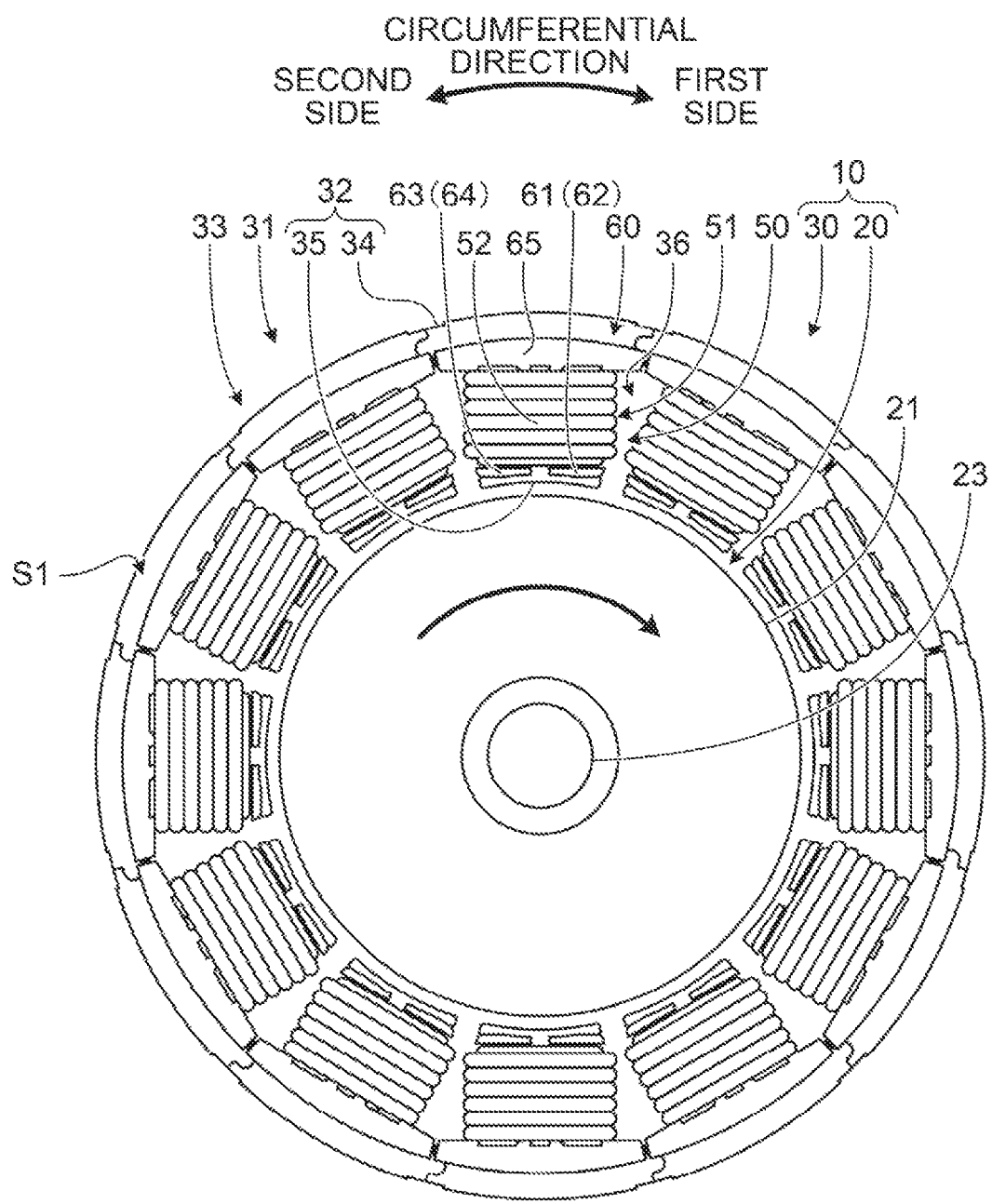
FIG. 2 is a plan view which shows an example of the schematic structure of the motor as a rotary machine omitting a part of the structure.

The rotor 20 includes a rotor core 21, a plurality of permanent magnets, and a shaft 23. In FIGS. 1 and 2, the illustration of the permanent magnets is omitted. The rotor core 21 is, for example, formed by laminating punched steel plates while punching the steel plates with a press machine. As the steel plate, an electromagnetic steel plate is adopted. The rotor core 21 is provided with a plurality of permanent magnets. For example, the plurality of permanent magnets are each housed in a plurality of spaces formed in the rotor core 21. When the rotor 20 is such a type of rotor, the motor 10 is referred to as an IPM (Interior Permanent Magnet) motor. The plurality of permanent magnets may be provided on an outer peripheral surface of the rotor core 21. When the rotor 20 is such a type of rotor, the motor 10 is referred to as a SPM (Surface Permanent Magnet) motor.

The shaft 23 is fixed to a through hole formed in the central portion of the rotor core 21. Bearings are attached to the shaft 23 on both sides of the rotor core 21. The bearings are supported by support portions provided on the stator 30. In FIGS. 1 and 2, the illustration of the bearings and the support portions is omitted. The shaft 23 serves as a rotation shaft. The rotor 20 rotates about the shaft 23. The rotor 20 is the same as the rotor provided in a known motor (rotary machine). Therefore, other description of the rotor 20 will be omitted.

The stator 30 includes a stator core 31, a plurality of coils 50, an insulator 60, and a molded body 80 (see FIGS. 1, 2, 5, and 7). In FIG. 2, the illustration of the molded body is omitted. The stator core 31 includes a yoke 33 and a plurality of teeth 35 (see FIGS. 2 and 5). The stator core 31 is formed by arranging a plurality of core segments 32 in an annular shape (see FIGS. 1, 2 and 5). In the embodiment, the stator core 31 is formed by arranging twelve core segments 32 in an annular shape. In one core segment 32, the number of the tooth 35 is one (see the left middle row of FIG. 3). Therefore, the stator core 31 includes twelve teeth 35 (see FIGS. 2 and 5). The twelve teeth 35 protrude from the yoke 33 toward the shaft 23 side. Twelve slots 36 are formed in the stator core 31 (see FIG. 2). The slot 36 is a space formed between adjacent teeth 35. The number of slots of the stator 30 is appropriately determined in consideration of the following points. The previously described points are, for example, the performance required for the motor 10.

In the embodiment, a circumferential direction about the shaft 23 (rotational shaft of the rotor 20) is referred to as "circumferential direction". The circumferential direction includes a rotation direction and a counter-rotation direction. The rotation direction is a direction in which the rotor 20 rotates. The following arrows shown in the lower row of FIG. 1 and FIG. 2 indicate the rotation direction. The previously described arrow is an arc arrow shown on the upper side of the rotor 20 (see "fifth side in a lamination direction" described later) in the lower row of FIG. 1, and in FIG. 2, it is the arc arrow shown inside the rotor 20. The counter-rotation direction is a direction opposite to the rotation direction. One side in the circumferential direction is referred to as "first side", and the other side in the circumferential direction is referred to as "second side". The first side in the circumferential direction is a front side in the rotation direction, and the second side in the circumferential direction is a rear side in the rotation direction. A radiation direction centered on the shaft 23 (rotational axis of the rotor 20) is referred to as "radial direction". A direction in which the tooth 35 protrude coincides with the radial direction. One side in the radial direction is referred to as "third side", and the other side in the radial direction is referred to as "fourth side". The third side in the radial direction is a side of the rotor and the fourth side in the radial direction is a side opposite to the side of the rotor 20. In the inner rotary type motor 10, the third side in the radial direction is a central side in the radial direction, and the fourth side in the radial direction is an outer side in the radial direction.

Figure 3:
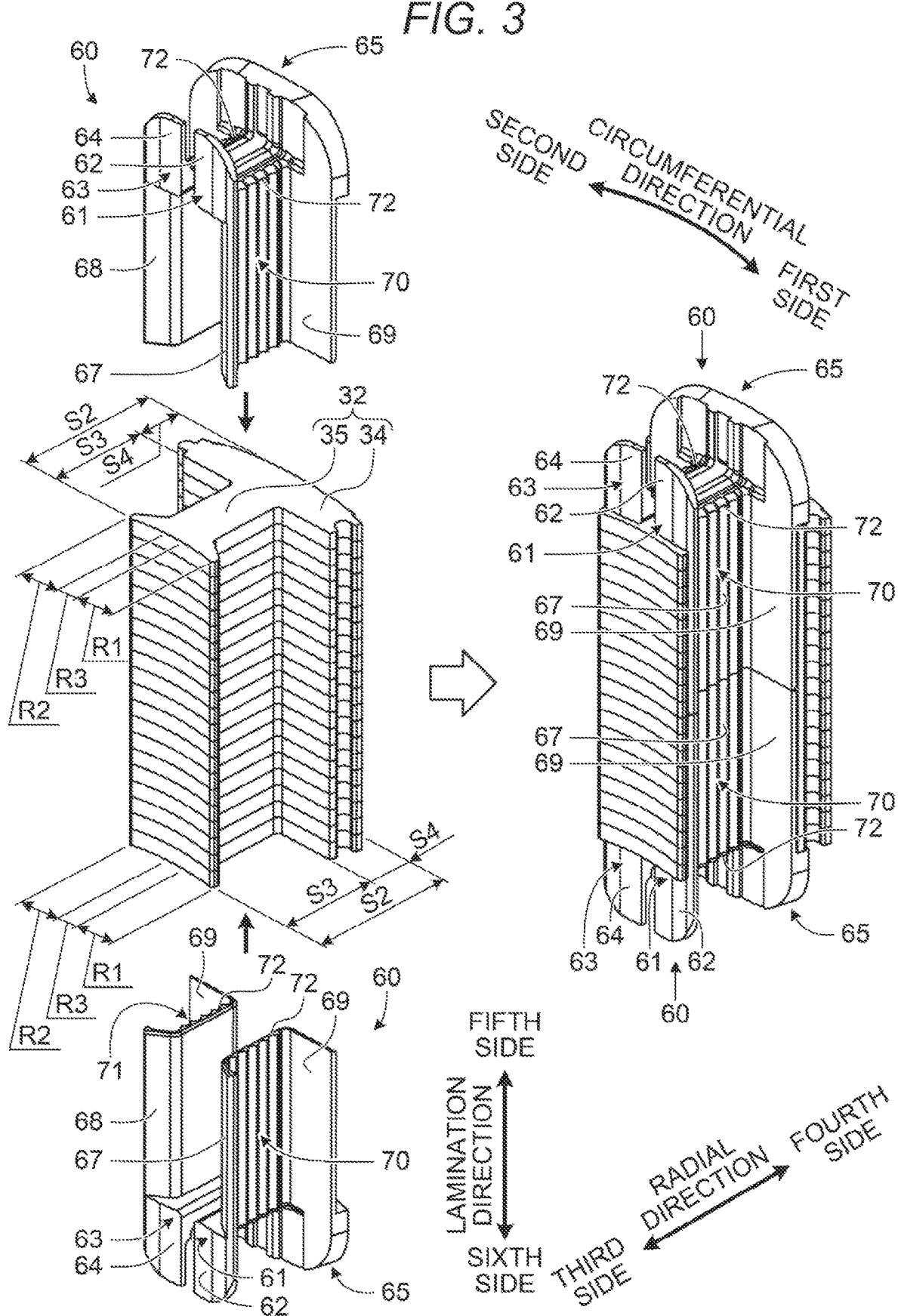
FIG. 3 is a perspective view which shows an example of schematic structures of a core segment and one set of insulators. The left side shows a state before the insulators are mounted to the core segment. The left upper row shows the insulator on a fifth side in a lamination direction. The left middle row shows the core segment. The left lower row shows the insulator on a sixth side in the lamination direction. The right side shows a state in which the insulators are mounted to the core segment.

The core segment 32 includes a yoke piece 34 and a tooth 35 (see the left middle row of FIG. 3). The core segment 32 is, for example, formed by laminating punched steel plates while punching the steel plates with a press machine. As the steel plate, an electromagnetic steel plate is adopted. In the embodiment, a direction in which the steel plates are laminated in the core segment 32 is referred to as "lamination direction". When the stator core 31 is formed by a plurality of core segments 32 (see FIGS. 1, 2 and 5), the lamination direction can also be said to be a direction in which the steel plates are laminated in the stator core 31. The lamination direction coincides with the direction laminating the steel plates in the rotor core 21. In the embodiment, one side in the lamination direction is referred to as the "fifth side", and the other side in the lamination direction is referred to as "sixth side".

Figure 4:
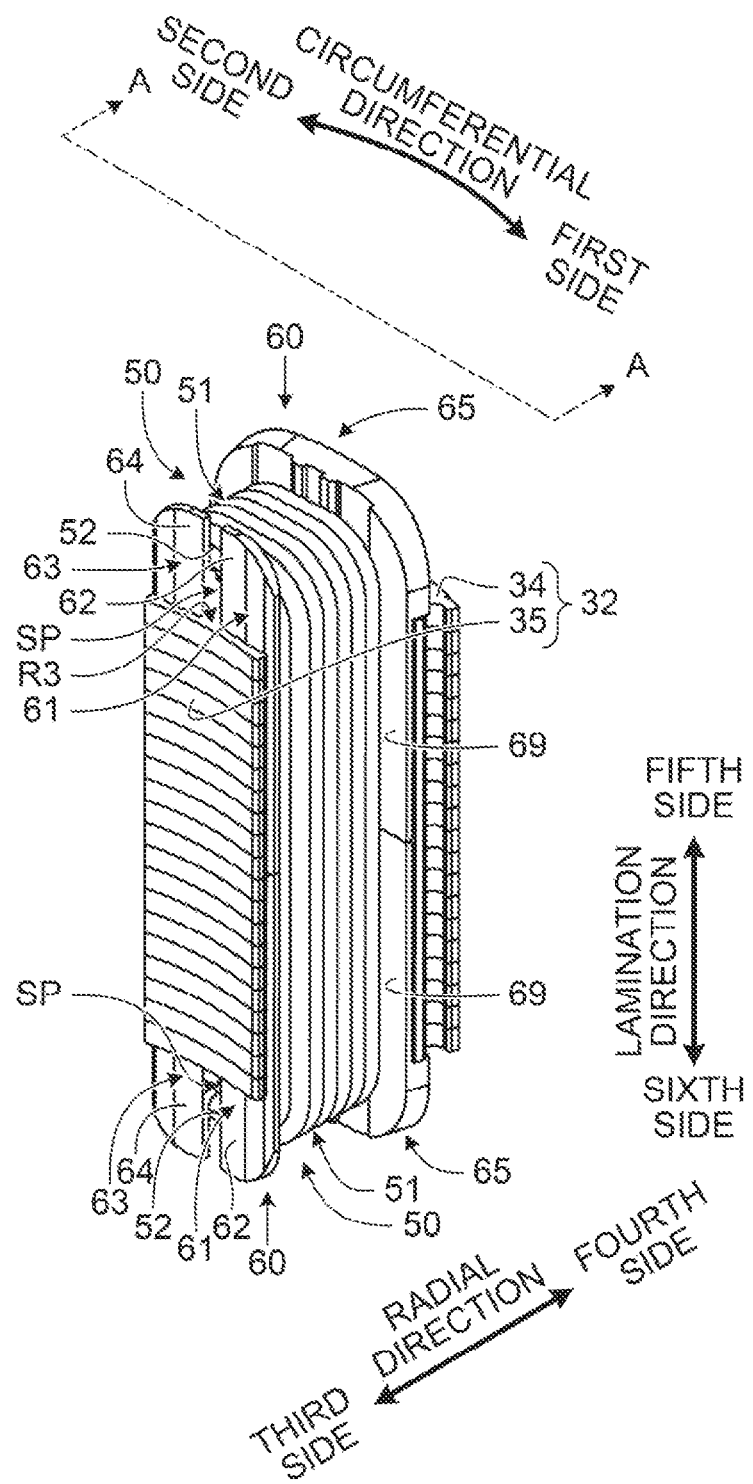
FIG. 4 is a perspective view which shows an example of a schematic structure of the core segment provided with a coil via the insulators.
Figure 5:
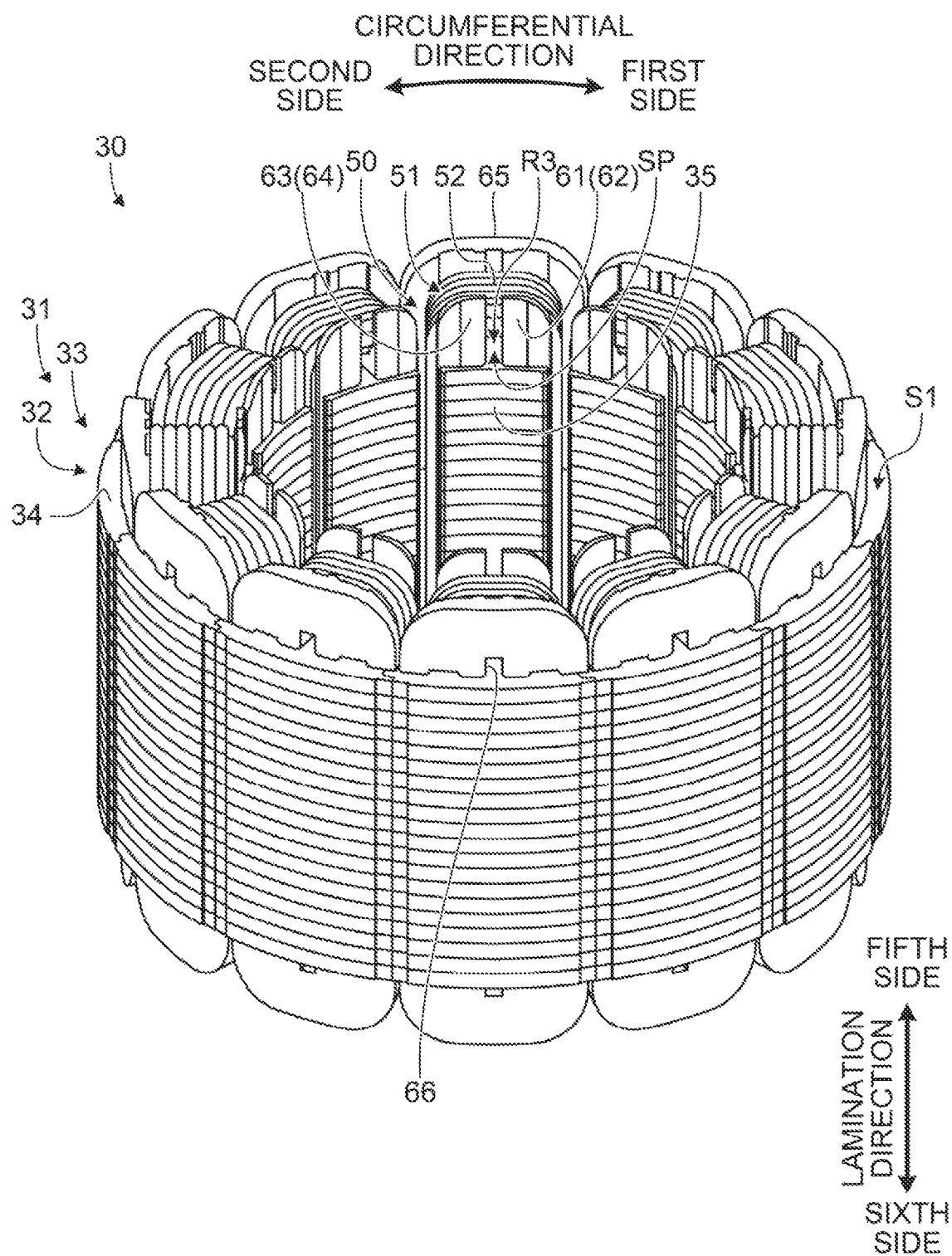
FIG. 5 is a perspective view which shows an example of a schematic structure of the stator. The stator shows a state before resin molding in which a plurality of core segments are arranged in an annular shape.

The yoke piece 34 forms the annular yoke 33 with the plurality of core segments 32 arranged in an annular shape (see FIGS. 2 and 5). In the yoke piece 34, a first side end in the circumferential direction is formed in a concave shape, and a second side end in the circumferential direction is formed in a convex shape (see the left middle row of FIG. 3). Among the plurality of core segments 32 arranged in an annular shape, in the two core segments 32 adjacent to each other in the circumferential direction, the convex portion formed at the second side end in the circumferential direction of the yoke piece 34 of the core segment 32 on the first side in the circumferential direction is fitted into the concave portion formed at the first side end in the circumferential direction of the yoke piece 34 of the core segment 32 on the second side in the circumferential direction (see FIGS. 2 and 5). The coil 50 is provided to the tooth 35. The coil 50 is formed by a predetermined winding machine for the core segment 32. For example, the coil 50 is concentrate wound around the tooth 35 (see FIGS. 2 and 4). Before forming the coil 50, a set of insulators 60 are mounted to the core segment 32 from the fifth side and the sixth side in the lamination direction, respectively (see FIG. 3).

In the stator 30, the plurality of coils 50 are classified into any of U-phase, V-phase, and W-phase coils. The same phase coils 50 are connected by a crossover. In FIGS. 2, 4 to 6, the illustration of the crossovers is omitted. The U-phase, V-phase, and W-phase coils 50 are connected by a predetermined method. For example, the U-phase, V-phase, and W-phase coils 50 are star connected. Such a configuration for a plurality of coils 50 is also adopted in a known motor (rotary machine). Therefore, other description of this configuration will be omitted. In the embodiment, the process of forming the coil 50 is referred to as "winding process". The process of connecting the U-phase, V-phase, and W-phase coils 50 is referred to as "connecting process".

Figure 6:
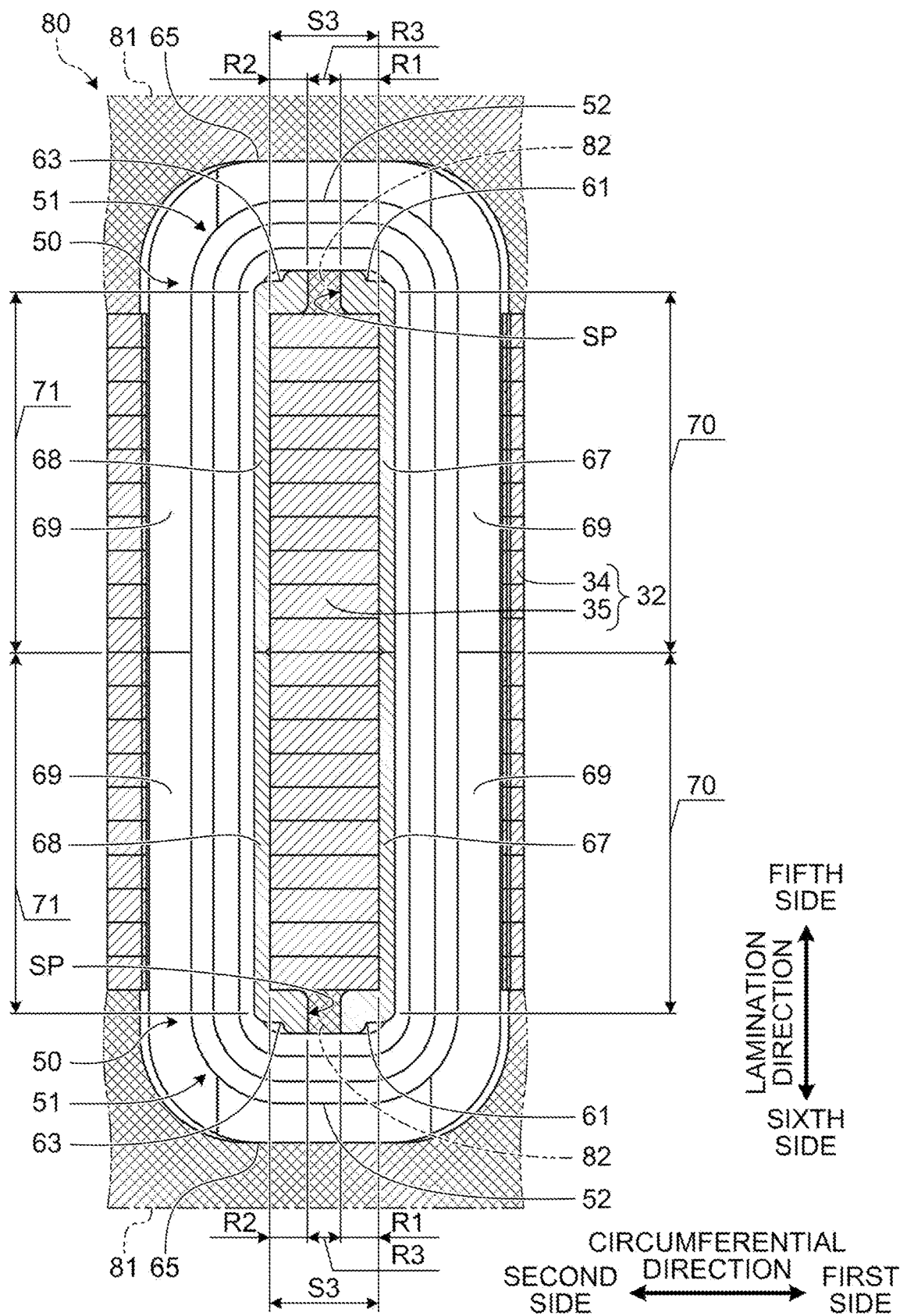
FIG. 6 is a cross-sectional view taken along line A—A shown in FIG. 4.

The insulator 60 electrically insulates the core segment 32 from the coil 50 provided to this core segment 32. Therefore, the insulator 60 electrically insulates the stator core 31 and the plurality of coils 50. In the embodiment, the insulators 60 have the same shape on the fifth side and the sixth side in the lamination direction, and is similarly mounted to the core segment 32 on the fifth side and the sixth side in the lamination direction (see FIG. 3). The insulators 60 on the fifth side and sixth side in the lamination direction are abutted on a side surface of the core segment 32 (see the right side of FIG. 3 and FIG. 6). The side surface of the core segment 32 forms the slot 36. In FIGS. 6 and 7, hatching (excluding cross-hatching) indicates a cross section.

However, the electrical insulation structure adopted by the stator 30 is an example. For example, in the stator 30, the insulator 60 on the fifth side in the lamination direction may have a different shape from the insulator 60 on the sixth side in the lamination direction. In addition, in the stator 30, in addition to the insulator 60, another insulating member may be provided. An example of the previously described insulating member includes a slot insulating paper. The slot insulating paper is a known insulating member. The electrical insulation structure including the previously described insulating member is also a technique that has already been put into practice use in a known motor (rotary machine). Therefore, other description regarding the following points will be omitted. The previously described points are points related to insulating members such as a slot insulating paper. Further, the previously described points are points related to the electrically insulating structure of the stator 30 using the previously described insulating member together with the insulator 60. In the embodiment, the insulators 60 on the fifth side and the sixth side in the lamination direction will be described without distinction. In this case, the fifth side and the sixth side in the lamination direction are referred to as "side in the lamination direction" without distinguishing them.

The insulator 60 is, for example, integrally formed by resin molding. Examples of the resin material forming the insulator 60 include the following synthetic resins. The previously described synthetic resins are polyamide (PA), polybutylene terephthalate (PBT), polyphenylene sulfide (PPS) and liquid crystal polymer (LCP).

The insulator 60 includes a first portion 61, a second portion 63, and a third portion 65 (see the left upper and lower rows of FIG. 3). The first portion 61 is provided on a first region R1 (see the left middle row and the right side of FIG. 3, and FIG. 6). The first region R1 is a region on the first side in the circumferential direction of an end surface S3 of the tooth 35 in the lamination direction (see the left middle row of FIG. 3, and FIG. 6). The second portion 63 is provided on a second region R2 at a distance from the first portion 61 in the circumferential direction (see the left middle row and right side of FIG. 3, and FIG. 6). The second region R2 is a region on the second side in the circumferential direction of the end surface S3 of the tooth 35 in the lamination direction (see the left middle row of FIG. 3, and FIG. 6). The end surface S3 of the tooth 35 is included in an end surface S2 of the core segment 32 which is on the same side in the lamination direction (see the left middle row of FIG. 3, and FIG. 7). The end surface S2 of the core segment 32 is included in an end surface S1 (see FIGS. 2 and 5) of the stator core 31 which is on the same side in the lamination direction. Therefore, the end surface S3 of the tooth 35 is also included in the end surface S1 of the stator core 31 which is on the same side in the lamination direction.

In the embodiment, a region between the first region R1 and the second region R2 in the circumferential direction of the end surface S3 of the tooth 35 is referred to as "third region R3" (see the left middle row of FIG. 3, and FIG. 6).

The third region R3 is exposed without being covered by the insulator 60 in a state in which the insulator 60 is attached to the core segment 32 (see the right side of FIG. 3, and FIGS. 4 to 6). As described above, the second portion 63 is separated from the first portion 61 in the circumferential direction. Therefore, in the stator 30, the coil 50 includes a portion in a coil end 51 that crosses between the first portion 61 and the second portion 63 in the circumferential direction (see FIGS. 4 to 6). The coil end 51 is a portion of the coil 50 that is not housed in the slot 36 and protrudes from the end surface S1 of the stator core 31 (the end surface S2 of the core segment 32) to the side in the lamination direction. In the embodiment, the portion of the coil end 51 that crosses between the first portion 61 and the second portion 63 in the circumferential direction is referred to as "crossing portion 52". In the stator 30, a housing space SP is formed in the following state (see FIGS. 4 to 6). The previously described state is a state in which the coil 50 is provided to the core segment 32 via the insulators 60. The housing space SP is a space surrounded by the crossing portion 52, the first portion 61, and the second portion 63 on the third region R3.

The third portion 65 is provided on the fourth side in the radial direction closer than the first portion 61 and the second portion 63 (see the left upper and lower rows of FIG. 3). The third portion 65 is connected to a fourth side end of the first portion 61 in the radial direction and is connected to a fourth side end of the second portion 63 in the radial direction. The third portion 65 is provided on an end surface S4 of the yoke piece 34 (see the left middle row and the right side of FIG. 3, and FIG. 7). The end surface S4 of the yoke piece 34 is a portion of the end surface S2 of the core segment 32 which is closer to the fourth side in the radial direction than the end surface S3 of the tooth 35 (see the left middle row of FIG. 3, and FIG. 7). The third portion 65 includes an opening 66 (see FIGS. 5 and 7). In the embodiment, the opening 66 is provided at the following position of the third portion 65. The previously described position is a central position in the circumferential direction. Further, the previously described position is an end position on the side of the end surface S2 of the core segment 32 (the end surface S4 of the yoke piece 34) in the lamination direction. The opening 66 penetrates the third portion 65 in the radial direction. The opening 66 leads to the housing space SP.

The first portion 61 includes a first support wall 62 at a third side end in the radial direction, and the second portion 63 includes a second support wall 64 at a third side end in the radial direction (see the left upper and lower rows of FIG. 3). The first support wall 62 supports the coil end 51 from the third side in the radial direction on the first side in the circumferential direction, the second support wall 64 supports the coil end 51 from the third side in the radial direction on the second side in the circumferential direction, and the third portion 65 supports the coil end 51 from the fourth side in the radial direction (see FIGS. 2, 4 and 5). That is, the insulator 60 supports the coil end 51 from the radial direction.

The insulator 60 includes a first covering wall 67, a second covering wall 68, and a third covering wall 69 (see the left upper and lower rows of FIG. 3). The first covering wall 67 is provided with respect to a side surface on the first side of the tooth 35 in the circumferential direction. In the embodiment, the first covering wall 67 covers a half region of the previously described side surface in the lamination direction. The first covering wall 67 is integrated with the first portion 61 in the lamination direction. The second covering wall 68 is provided with respect to the side surface on the second side of the tooth 35 in the circumferential direction. In the embodiment, the second covering wall 68 covers a half region of the previously described side surface in the lamination direction. The second covering wall 68 is integrated with the second portion 63 in the lamination direction.

The third covering wall 69 is provided with respect to a side surface on the third side of the yoke piece 34 in the radial direction and covers the previously described side surface. In the core segment 32, the previously described side surfaces include a side surface which is closer to the first side in the circumferential direction than the tooth 35 and a side surface which is closer to the second side in the circumferential direction than the tooth 35. In the embodiment, the third covering wall 69 which is provided on the first side in the circumferential direction covers a half region of a side surface in the lamination direction on the third side of the yoke piece 34 in the radial direction which is closer to the first side in the circumferential direction than the tooth 35. The third covering wall 69 which is provided on the second side in the circumferential direction covers a half region of a side surface in the lamination direction on the third side of the yoke piece 34 in the radial direction which is closer to the second side in the circumferential direction than the tooth 35. The two third covering walls 69 are integrated with the third portion 65 in the lamination direction at positions on the first side and the second side in the circumferential direction from the tooth 35, respectively. The third covering wall 69 which is provided on the first side in the circumferential direction is connected to a fourth side end of the first covering wall 67 in the radial direction. The third covering wall 69 provided on the second side in the circumferential direction is connected to a fourth side end of the second covering wall 68 in the radial direction.

The molded body 80 includes two covering bodies 81 on the fifth side and the sixth side in the lamination direction (see the lower row of FIG. 1, and FIGS. 6 and 7). In FIG. 6, the two-dot chain line and cross-hatching indicate that the following portions drawn by them are imaginary illustrations. The previously described portions are a part of the covering body 81 and an insert body 82 which will be described later. The covering body 81 on the fifth side in the lamination direction covers the following first structure, second structure, and third structure. The first structure is the end surface S1 on the fifth side of the stator core 31 in the lamination direction. The second structure is the first portion 61, the second portion 63, and the third portion 65 protruding from the previously described end surface S1 to the fifth side in the lamination direction at the insulator 60 on the fifth side in the lamination direction. The third structure is the coil end 51 on the fifth side in the lamination direction. The covering body 81 on the sixth side in the lamination direction covers the following fourth structure, fifth structure, and sixth structure. The fourth structure is the end surface S1 on the sixth side of the stator core 31 in the lamination direction. The fifth structure is the first portion 61, the second portion 63, and the third portion 65 protruding from the previously described end surface S1 to the sixth side in the lamination direction at the insulator 60 on the sixth side in the lamination direction. The sixth structure is the coil end 51 on the sixth side in the lamination direction.

In the molded body 80, the covering bodies 81 on the fifth side and the sixth side in the lamination direction are connected by the following portions. The previously described portions are portions of the molded body 80 filled in the plurality of slots 36. In the embodiment, the previously described portions of the molded body 80 are not shown. The molded body 80 is integrally formed by resin molding after the winding process and the connecting process are completed. The previously described resin molding is performed by setting a plurality of core segments 32 (see FIG. 5) arranged in an annular shape in a molding die provided in a molding machine for resin molding.

In the embodiment, the covering bodies 81 have the same shape on the fifth side and the sixth side in the lamination direction, and are similarly provided on the end surfaces S1 of the stator core 31 on the fifth side and the sixth side in the lamination direction (see middle row of FIG. 1, and FIG. 7). A part of the covering body 81 becomes the insert body 82. That is, the molded body 80 includes the insert body 82 in the covering body 81. In such a configuration, it can be said that the covering body 81 includes the insert body 82. The insert body 82 is provided in the housing space SP (see FIGS. 6 and 7). A part of the resin material which will be the covering body 81 flows into the housing space SP at the time of resin molding and forms the insert body 82. Therefore, the insert body 82 is in a state of being fitted into the housing space SP. The insert body 82 is in contact with the first portion 61 and the second portion 63 in the circumferential direction, and is in contact with the third region R3 and the crossing portion 52 in the lamination direction.

A resin material forming the molded body 80 is preferable to be a resin material having a higher thermal conductivity than the resin material forming the insulator 60. An example of the resin material that forms the molded body 80 include the following synthetic resin. The previously described synthetic resin is BMC (Bulk Molding Compound). BMC is a thermosetting resin. BMC is a resin material mainly composed of unsaturated polyester, and includes, for example, a filler and glass fiber.

In the stator 30, the relationship between the thermal conductivity of the materials forming the following portions is as follows. The previously described portions are the stator core 31, the insulator 60, and the molded body 80. The previously described relationship is "stator core 31>molded body 80>insulator 60". As described above, a part of the resin material which will be the covering body 81 flows into the housing space SP at the time of resin molding and forms the insert body 82. Therefore, in the stator 30, the thermal conductivities of the resin materials forming the covering body 81 and the insert body 82 becomes equal. Therefore, the previously described relationship can be said to be "stator core 31>covering body 81=inserting body 82>insulator 60".

<Effect of Embodiment>

According to the embodiment, the following effects can be obtained.

(1) The insulator 60 includes the first portion 61, the second portion 63, and the third portion 65 as portions corresponding to the coil end 51 (see the left upper and lower rows of FIG. 3, and FIG. 4). The first portion 61 is provided on the first region R1 of the end surface S3 of the tooth 35. The second portion 63 is provided on the second region R2 of the end surface S3 of the tooth 35 so as to be separated from the first portion 61 in the circumferential direction. The third portion 65 is provided to the fourth side in the radial direction closer than the first portion 61 and the second portion 63. The third portion 65 is connected to the fourth side end of the first portion 61 in the radial direction, and is connected to the fourth side end of the second portion 63 in the radial direction. The coil 50 includes the crossing portion 52 in the coil end 51 (see FIGS. 2, 4 to 7). The crossing portion 52 crosses between the first portion 61 and the second portion 63 in the circumferential direction. The molded body 80 includes the insert body 82 in the covering body 81 (see FIG. 7). The insert body 82 is provided in the housing space SP in a state of being in contact with the third region R3 and the crossing portion 52. The housing space SP is surrounded by the crossing portion 52, the first portion 61, and the second portion 63 on the third region R3 (see FIGS. 4 to 6). The insert body 82 is made of a material having a higher thermal conductivity than the material forming the insulator Thus, a part of the molded body 80 can be used as the insert body 82. The heat generated by the coil 50 can be released to the stator core 31 via the insert body 82. For example, the motor 10 can release the heat generated by the coil 50 to the stator core 31 as compared with a motor in which a stator is provided with the following insulators. The previously described insulator is an insulator including an integral portion provided on the whole first region R1, second region R2, and third region R3. In such an insulator, the previously described integral portion also covers the third region R3 as well as the first region R1 and the second region R2. Therefore, in the motor of the previously described comparative example, the housing space SP is not formed in the stator, and the insertion body 82 cannot be provided in the housing space SP. The motor 10 can suppress the temperature rise of the coil 50 by the stator 30. In the motor 10, the outer peripheral surface of the stator core 31 is exposed without being covered by the molded body 80 (see FIG. 1). The stator 30 may be housed in a predetermined case in the following state. The previously described state is a state in which the outer peripheral surface of the stator core 31 is in contact with the inner peripheral surface of the previously described case. The stator 30 may be fitted in the previously described case. The previously described case is, for example, made of metal. The heat generated by the coil 50 can be released to the stator core 31 and further to the previously described case.

(2) The third portion 65 includes the opening 66 (see FIG. 5). The opening 66 leads to the housing space SP (see FIG. 7). Thus, the insert body 82 can be provided to the housing space SP from the fourth side in the radial direction via the opening 66. That is, when the molded body 80 is resin-molded, the resin material can be poured into the housing space SP from both the third side and the fourth side in the radial direction.

<Modifications>

The embodiment can also be configured as follows. Some configurations of modifications illustrated below may also be employed in combination as appropriate. In the following description, points different from the above description are described, and the description of similar points is omitted as appropriate.

(1) As the rotary machine, the inner rotary type motor 10 has been described as an example. The structure of the stator 30 using the insulator 60 described above can also be adopted for a generator as a rotary machine. The structure of the stator 30 using the insulator 60 described above can also be adopted for a stator of an exterior rotary type rotary machine. In the stator of an exterior rotary type rotary machine, a plurality of teeth protrude outward from a yoke in a radial direction. A rotor of the exterior rotary type rotary machine faces the plurality of teeth on the outside of the stator in the radial direction. Therefore, the third side in the radial direction, which was the side of the rotor in the above, is the outer side in the radial direction in the exterior rotary type rotary machine. The fourth side in the radial direction, which was the side opposite to the side of the rotor 20 in the above, is the central side in the radial direction. Even in the stator of the exterior rotary type rotary machine, an insulator which has the same structure as the insulator 60 is provided to the stator core as described above. The exterior rotary type rotary machine is a rotary machine that has already been put into practical use. Therefore, other description of the exterior rotary type rotary machine will be omitted.

(2) The stator core 31 is formed by arranging a plurality of core segments 32 in an annular shape (see FIGS. 2 and 5). The stator core may be an integrated stator core. In this case, the stator core is formed by laminating steel plates punched into an annular shape while punching the steel plates into an annular shape in which a yoke and a plurality of teeth are integrated. When the stator core is integrated, the insulator may have an integral annular shape corresponding to the integrated stator core. For example, the insulator may have an annular shape connected by a portion corresponding to the third portion 65 described above. A set of annular insulators is mounted on the integrated stator core from the fifth side and the sixth side in the lamination direction, respectively.

(3) The stator 30 includes the molded body 80 (see the middle and lower rows of FIG. 1, and FIG. 7). The molded body 80 includes the insert body 82 in the covering body 81 (see FIGS. 6 and 7). The molded body 80 may be omitted. In this case, the stator is provided with an independent insert body. For example, the insert body has a rod-like shape. The insert body is inserted into the housing space SP from the third side or the fourth side in the radial direction at a predetermined timing after the winding process is completed. It is preferable that the insert body is in a press fitted state with respect to the housing space SP. When the insert body is inserted from the fourth side in the radial direction, the insert body passes through the opening 66 of the third portion 65. In addition, after mounting the insulators 60 to the core segment 32 from the fifth side and the sixth side in the lamination direction (see the right side of FIG. 3), before the winding process, the insert body may be mounted between the first portion 61 and the second portion 63. In this case, the winding process is carried out with the insert body provided between the first portion 61 and the second portion 63 on the third region R3. The insert body is pressed against the third region R3 by the coil 50. That is, the insert body is in a state of being pressed against the third region R3 by the crossing portion 52 of the coil end 51. In a state in which the insert body is provided in the housing space SP, the fourth side end of the insert body in the radial direction may be provided in the opening 66. The material forming the insert body may be a material having a higher thermal conductivity than the resin material forming the insulator 60. For example, the insert body may be formed by BMC. In addition, the insert body may be made of a resin material or ceramic different from BMC. It is preferable that the insert body is made of a nonmagnetic material. The material forming the insert body is appropriately determined in consideration of various conditions. Even the stator includes the molded body, the insert body may be a separate body from the covering body. In this case, the thermal conductivity of the materials forming the covering body (molded body) and the insert body is preferably "inserted body covering body (molded body)". The relationship between the thermal conductivity of the materials forming the stator core 31, the insulator 60, the covering body (molded body), and the insert body is "stator core 31>insert body covering body (molded body)>insulator 60".

(4) In the insulator 60, the first portion 61 is provided on the first region R1 and the second portion 63 is provided on the second region R2 so as to be separated from the first portion 61 in the circumferential direction (see the left middle row and the right side of FIG. 3, and FIG. 6). The insulator may be provided with the following fourth portion. The fourth portion connects a part of the first portion 61 and a part of the second portion 63. That is, in this insulator, the first portion 61 is connected to the second portion 63 by the fourth portion. For example, the fourth portion may be connected to a part of the side surface of the first portion 61 forming the housing space SP at an end portion on the first side in the circumferential direction, and may be connected to a part of the side surface of the second portion 63 forming the housing space SP at an end portion on the second side in the circumferential direction. The side surface of the first portion 61 forming the housing space SP faces the side surface of the second portion 63 forming the housing space SP in the circumferential direction.

The fourth portion has a rod-like shape or a plate-like shape. However, the shape of the fourth portion may be different from the rod-like shape or the plate-like shape.

The shape of the fourth portion is appropriately determined in consideration of various conditions. The arrangement of the fourth portion with respect to the first portion 61 and the second portion 63 is appropriately determined in consideration of various conditions. The number of the fourth portion with respect to the first portion 61 and the second portion 63 is appropriately determined in consideration of various conditions. The fourth portion has a shape, arrangement, and number so that one housing space SP does not become two independent spaces on the fifth side and the sixth side in the lamination direction. The insert body, at the housing space SP continuous in the lamination direction, is in contact with the first portion 61 and the second portion 63 in the circumferential direction, and is in contact with the third region R3 and the crossing portion 52 in the lamination direction.

(5) Although the description is omitted above, the insulator 60 includes a plurality of grooves 72 along the lamination direction on a first surface 70 and a second surface 71 (see the left upper and lower rows, and the right side of FIG. 3). The first surface 70 is an integral surface in the lamination direction along the radial direction of the surface on the first side in the circumferential direction of the insulator 60 forming the first portion 61 and the first covering wall 67 (see the left upper and lower rows, and the right side of FIG. 3, and FIG. 6). The second surface 71 is an integral surface in the lamination direction along the radial direction of the surface on the second side in the circumferential direction of the insulator 60 forming the second portion 63 and the second covering wall 68 (see the left lower row of FIG. 3, and FIG. 6). In the winding process, the coil 50 can be aligned along the grooves 72. The space factor of the coil 50 can be increased. However, in the insulator, the grooves 72 may be omitted. For example, if the space factor of the coil 50 is not a problem, an insulator that does not include the grooves 72 can be adopted. Whether or not to provide the grooves 72 to the insulator is appropriately determined in consideration of various conditions.

(6) For convenience of explanation, the first side and the second side in the circumferential direction were set so that the rotating direction is from the second side to the first side in the circumferential direction (see FIGS. 1 and 2). The rotation direction was clockwise. However, the first side and the second side in the circumferential direction may be set in the opposite side to the above. That is, the side in the circumferential direction which is the second side in the circumferential direction above, may be the first side in the circumferential direction. The side in the circumferential direction which is the first side in the circumferential direction above, may be the second side in the circumferential direction. When the first side and the second side in the circumferential direction are set as previously described and the rotating direction is clockwise, the rotating direction is from the first side to the second side in the circumferential direction. The rotating direction may be counterclockwise.

The fifth side and the sixth side in the lamination direction were set as follows. That is, the upper side when the paper surfaces of FIG. 1, and 3 to 7 are viewed straight from the front is the fifth side in the lamination direction, and the lower side in the previously described case is the sixth side in the lamination direction. However, the fifth side and the sixth side in the lamination direction may be set in the opposite side to the above. That is, the side in the lamination direction which is the sixth side in the lamination direction above, may be the fifth side in the lamination direction. The side in the lamination direction which is the fifth side in the lamination direction above, may be the sixth side in the lamination direction.

DESCRIPTION OF REFERENCE SIGNS

10 Motor
20 Rotor
21 Rotor core
23 Shaft
30 Stator
31 Stator core
32 Core segment
33 Yoke
34 Yoke piece
35 Tooth
36 Slot
50 Coil
51 Coil end
52 Crossing portion
60 Insulator
61 First portion
62 First support wall
63 Second portion
64 Second support wall
65 Third portion
66 Opening
67 First covering wall
68 Second covering wall
69 Third covering wall
70 First surface
71 Second surface
72 Groove
80 Molded body
81 Covering body
82 Insert body
R1 First region
R2 Second region
R3 Third region
S1 End surface (stator core 31)
S2 End surface (core segment 32)
S3 End surface (tooth 35)
S4 End surface (yoke piece 34)
SP Housing space

The invention claimed is:

1. A rotary machine comprising:
a rotor, and
a stator,
wherein the stator includes:
a stator core formed by laminating steel plates and includes a yoke and a tooth which protrudes from the yoke towards a side of the rotor;
an insulator which is provided to the stator core, and
a coil which is provided to the tooth via the insulator,
wherein the insulator includes:
a first portion which is provided on a first region on a first side in a circumferential direction about a rotation axis of the rotor, the first portion being positioned over the tooth in a lamination direction in which the steel plates are laminated;
a second portion which is provided on a second region on a second side in the circumferential direction, the second portion being separated from the first portion in the circumferential direction, and
a third portion provided on a fourth side opposite to a third side, the third side is a side which is closer to the rotor in a radial direction about the rotation axis of the rotor than the first portion and the second portion, the third portion is connected to a fourth side end of the first portion in the radial direction and is connected to a fourth side end of the second portion in the radial direction,
wherein the coil includes, in a coil end of the coil, a crossing portion which crosses between the first portion and the second portion in the circumferential direction,
wherein the stator further includes an insert body provided in a contact state with a third region and the crossing portion, the third region which is between the first region and the second region in the circumferential direction of the end surface of the tooth, the insert body is provided in a housing space which is surrounded by the crossing portion, the first portion, and the second portion on the third region,
wherein the insert body has a radial width from a first end abutting the coil to a second end abutting the stator core that is at least a maximum radial width of the coil at the crossing portion, and
wherein the insert body is made of a material having a higher thermal conductivity than a material forming the insulator.

2. The rotary machine according to claim 1, wherein the third portion includes an opening which penetrates the third portion in the radial direction, and which leads to the housing space.

3. The rotary machine according to claim 1, wherein the stator is provided with a molded body made of resin which covers the coil end, and
wherein the molded body includes the insert body.

4. An insulator which is provided to a stator core of a stator of a rotary machine, the insulator comprising:
a first portion which is provided on a first region on a first side in a circumferential direction about a rotation axis of a rotor of the rotary machine, the first portion being positioned over a tooth of a steel plate of the stator core in a lamination direction in which steel plates which forms the stator core are laminated;
a second portion which is provided on a second region on a second side in the circumferential direction, the second portion being separated from the first portion in the circumferential direction, and a third portion provided on a fourth side opposite to a third side, the third side is a side which is closer to the rotor in a radial direction about the rotation axis of the rotor than the first portion and the second portion, the third portion being connected to the first and second portions such that the first portion extends radially inward from the third portion and the second portion extends radially inward from the third portion, the first and second portions being entirely spaced apart from each other.

5. The rotary machine according to claim 2, wherein the stator is provided with a molded body made of resin which covers the coil end, and wherein the molded body includes the insert body.

\* \* \* \* \*